(12) United States Patent
Ferraro (10) Patent No.: US 10,236,930 B1
(45) Date of Patent: Mar. 19, 2019

(54) AUTOMATICALLY ACTIVATED FLOTATION DEVICE FOR USE ON A MOBILE COMMUNICATIONS DEVICE AND METHODS OF MAKING AND USING SAME

(71) Applicant: Donald M. Ferraro, Bangor, PA (US)

(72) Inventor: Donald M. Ferraro, Bangor, PA (US)

( * ) Notice: Subject to any disclaimer, the term of this patent is extended or adjusted under 35 U.S.C. 154(b) by 0 days.

(21) Appl. No.: 16/045,542

(22) Filed: Jul. 25, 2018

(51) Int. Cl.
*H04B 1/38* (2015.01)
*H04B 1/3888* (2015.01)

(52) U.S. Cl.
CPC ... *H04B 1/3888* (2013.01); *H04B 2001/3894* (2013.01)

(58) Field of Classification Search
CPC ............... H04B 1/3888; H04B 2001/3894
See application file for complete search history.

(56) References Cited

U.S. PATENT DOCUMENTS

| | | | |
|---|---|---|---|
| 2,642,693 A | 6/1953 | Broady | |
| 3,071,787 A | 1/1963 | Burker | |
| 5,210,525 A | 5/1993 | Lennon et al. | |
| 5,857,881 A | 1/1999 | Zippel, Sr. | |
| 6,036,559 A | 3/2000 | Arnold et al. | |
| 7,261,606 B2 * | 8/2007 | Mickelson | A01K 93/00 441/6 |
| 8,430,704 B2 * | 4/2013 | Jeffrey | B63B 22/166 441/13 |
| 9,022,825 B1 * | 5/2015 | Meyer | B63C 9/18 441/39 |
| 9,615,476 B2 | 4/2017 | Rayner et al. | |
| 2016/0227896 A1 * | 8/2016 | Chien | A45C 11/00 |
| 2017/0073052 A1 * | 3/2017 | Agapiades | B63C 9/155 |
| 2018/0115638 A1 * | 4/2018 | Bower | H04M 1/18 |

* cited by examiner

*Primary Examiner* — Simon Nguyen
(74) *Attorney, Agent, or Firm* — James R. McDaniel

(57) ABSTRACT

An automatically activated flotation device for use on a mobile communications device, including a mobile communications device, and a case operatively attached to the mobile communications device, wherein the front side of the case is located adjacent to the mobile communications device, wherein the case further includes a rod carrier connected to the case such that the at least one rod carrier, a one-way valve assembly operatively connected to a first end of the rod carrier, a chemical rod located within the rod carrier and located adjacent to the one-way valve assembly, and an inflation assembly operatively connected to the case and operatively connected to the at least one rod carrier, wherein if the mobile communications device contacts a body of water, a portion of the body of water interacts with the chemical rod to produce a gas that triggers the inflation assembly to inflate and cause the mobile communications device to float on the body of water.

20 Claims, 9 Drawing Sheets

FIG. 9

AUTOMATICALLY ACTIVATED FLOTATION DEVICE FOR USE ON A MOBILE COMMUNICATIONS DEVICE AND METHODS OF MAKING AND USING SAME

FIELD OF THE INVENTION

The present invention is generally related to an automatically activated flotation device for use on a mobile communications device. The flotation device would be automatically activated if the mobile communications device were dropped into a body of water having a significant depth (greater than 2 meters). The flotation device would be integrated into a protective case that can be securely and firmly attached to the mobile communications device. Once the mobile communications device contacted the body of water, the flotation device would be automatically activated so that the mobile communications device would then float to the top of the body of water. In this manner, the mobile communications device could be retrieved from the body of water before the water adversely affects the operation of the mobile communications device

BACKGROUND OF THE INVENTION

It is known that current models of mobile communications devices such as mobile telephones and tablets can contact a liquid such as water and still continue to operate as designed as long as the contact between the liquid and the mobile communications device was not too long. For example, if a drink is accidently spilled on a mobile telephone, the user can simply remove the battery from the mobile telephone, wipe off the battery and the rest of the mobile telephone, allow the battery and the mobile telephone to completely dry out, re-install the battery and turn on the mobile telephone. In many instances, the mobile telephone then will continue to operate as designed.

It is also known that mobile communications devices can be dropped in a body of water having a significant depth (greater than 2 meters) such as a swimming pool, a lake, a pond, a river, an ocean or the like and if the mobile communications device is retrieved from the body of water before the mobile communications device spends too much time in the body of water or sinks too far into the body of water (greater than 3 meters of depth in the body of water), the mobile communications device may be able to be retrieved and dried out, as previously discussed. However, if the mobile communications device is allowed to spend too much time in the body of water or the mobile communications device sinks too far into the body of water (greater than 3 meters of depth in the body of water), the mobile communications device will probably not properly operate after such an event. Furthermore, if the mobile communications device is dropped into a relatively deep body of water such as a pond, lake, river or ocean and the mobile communications device is not immediately retrieved, the mobile communications device will probably continue to sink further into the depth of the body of water and will be lost. Therefore, it would be desired to have an automatically activated flotation device for use on a mobile communications device, wherein the flotation device would be automatically activated if the mobile communications device were dropped in a body of water having a significant depth.

Prior to the present invention, as set forth in general terms above and more specifically below, it is known, to employ various types of flotation devices for use on various devices. See for example, U.S. Pat. No. 2,642,693 by Broady, U.S. Pat. No. 3,071,787 by Burlier, U.S. Pat. No. 5,210,525 by Lennon et at, U.S. Pat. No. 5,857,881 by Zippel, Sr., U.S. Pat. No. 6,036,559 by Arnold et at, U.S. Pat. No. 7,261,606 by Mickelson et at, U.S. Pat. No. 8,430,704 by Jeffrey, U.S. Pat. No. 9,022,825 by Meyer, and U.S. Pat. No. 9,615,476 by Rayner et al. While these various floatation devices may have been generally satisfactory, there is nevertheless a need for a new and improved automatically activated flotation device for use on a mobile communications device, wherein the flotation device would be automatically activated if the mobile communications device were dropped into a body of water having a significant depth (greater than 2 meters).

It is a purpose of this invention to fulfill these and other needs in the disposable seat pad art in a manner more apparent to the skilled artisan once given the following disclosure.

BRIEF SUMMARY OF THE INVENTION

A first aspect of the present invention is an, automatically activated flotation device for use on a mobile communications device, including a mobile communications device having a front side and a back side, and a case operatively attached to the back side of the mobile communications device such that the case includes a front side and a back side, wherein the front side of the case is located adjacent to the back side of the mobile communications device, wherein the case further includes at least one rod carrier operatively connected to a portion of the back side of the case such that the at least one rod carrier has a first end and a second end, a one-way valve assembly operatively connected to the first end of the rod carrier, a chemical rod located within the at least one rod carrier and located adjacent to the one-way valve assembly, and an inflation assembly operatively connected to a side of the case and operatively connected to the at least one rod carrier, wherein if the mobile communications device contacts a body of water, a portion of the body of water interacts with the chemical rod to produce a gas that triggers the inflation assembly to inflate and cause the mobile communications device to float on the body of water.

In one embodiment of the first aspect of the present invention, the case further includes a pressure relief valve assembly operatively connected to the second end of the rod carrier.

In another embodiment of the first aspect of the present, the one-way valve assembly further includes a one-way valve having a first extension, and a first ball located within the first extension.

In a further embodiment of the first aspect of the present invention, the one-way valve further includes a water inlet hole located at one end of the one-way valve, a plurality of slotted openings located along a section of the first extension, and an opening located at one end of the extension.

In a yet another embodiment of the first aspect of the present invention, the inflation assembly further includes a plurality of vessel assembly tracks operatively connected to the side of the case, a plurality of inflation ports located on the side of the case and located between the plurality of vessel assembly tracks, a plurality of doors located adjacent to the plurality of vessel assembly tracks such that the plurality of doors is hingedly connected to the case, and an inflation vessel operatively connected to the plurality of vessel assembly tracks and located behind the plurality of doors.

In a yet further embodiment of the first aspect of the present invention, the inflation vessel further includes an assembly track operatively connected to the inflation vessel.

In a still another embodiment of the first aspect of the present invention, the pressure relief valve assembly further includes a pressure relief valve having a second extension located at one end of the pressure relief valve and a pressure exit port located adjacent to another end of the pressure relief valve, a spring located within the second extension, and a second ball located within the second extension such that the second ball contacts the spring.

In an even further embodiment of the first aspect of the present invention, the chemical rod further includes an effervescent material designed to produce a solution that releases carbon dioxide simultaneously when the effervescent material contacts water.

A second aspect of the present invention is an automatically activated flotation device for use on a mobile communications device, including a mobile communications device having a front side and a back side, and a case operatively attached to the back side of the mobile communications device such that the case includes a front side and a back side, wherein the front side of the case is located adjacent to the back side of the mobile communications device, wherein the case further includes at least one rod carrier operatively connected to a portion of the back side of the case such that the at least one rod carrier has a first end and a second end, a one-way valve assembly operatively connected to the first end of the rod carrier, a pressure relief valve assembly operatively connected to the second end of the rod carrier, a chemical rod located within the at least one rod carrier and located adjacent to the one-way valve assembly, and an inflation assembly operatively connected to a side of the case and operatively connected to the at least one rod carrier, wherein if the mobile communications device contacts a body of water, a portion of the body of water interacts with the chemical rod to produce a gas that triggers the inflation assembly to inflate and cause the mobile communications device to float on the body of water.

In another embodiment of the second aspect of the present, the one-way valve assembly further includes a one-way valve having a first extension, and a first ball located within the first extension.

In a further embodiment of the second aspect of the present invention, the one-way valve further includes a water inlet hole located at one end of the one-way valve, a plurality of slotted openings located along a section of the first extension, and an opening located at one end of the extension.

In a yet another embodiment of the second aspect of the present invention, the inflation assembly further includes a plurality of vessel assembly tracks operatively connected to the side of the case, a plurality of inflation ports located on the side of the case and located between the plurality of vessel assembly tracks, a plurality of doors located adjacent to the plurality of vessel assembly tracks such that the plurality of doors is hingedly connected to the case, and an inflation vessel operatively connected to the plurality of vessel assembly tracks and located behind the plurality of doors.

In a yet further embodiment of the second aspect of the present invention, the inflation vessel further includes an assembly track operatively connected to the inflation vessel.

In a still another embodiment of the second aspect of the present invention, the pressure relief valve assembly further includes a pressure relief valve having a second extension located at one end of the pressure relief valve and a pressure exit port located adjacent to another end of the pressure relief valve, a spring located within the second extension, and a second ball located within the second extension such that the second ball contacts the spring.

In an even further embodiment of the second aspect of the present invention, the chemical rod further includes an effervescent material designed to produce a solution that releases carbon dioxide simultaneously when the effervescent material contacts water.

A third aspect of the present invention is an a method of constructing an automatically activated flotation device for use on a mobile communications device, including the steps of: providing a mobile communications device having a front side and a back side; and providing a case operatively attached to the back side of the mobile communications device such that the case includes a front side and a back side, wherein the front side of the case is located adjacent to the back side of the mobile communications device, wherein the step of providing a case further includes the steps of; providing at least one rod carrier operatively connected to a portion of the back side of the case such that the at least one rod carrier has a first end and a second end, providing a one-way valve assembly operatively connected to the first end of the rod carrier, providing a chemical rod located within the at least one rod carrier and located adjacent to the one-way valve assembly, and providing an inflation assembly operatively connected to a side of the case and operatively connected to the at least one rod carrier, wherein if the mobile communications device contacts a body of water, a portion of the body of water interacts with the chemical rod to produce a gas that triggers the inflation assembly to inflate and cause the mobile communications device to float on the body of water.

In another embodiment of the third aspect of the present invention, the step of providing a case further includes the step of providing a pressure relief valve assembly operatively connected to the second end of the rod carrier.

In a further embodiment of the third aspect of the present invention, the step of providing a one-way valve assembly further includes the steps of providing a one-way valve having a first extension and providing a first ball located within the first extension.

In yet another embodiment of the third aspect of the present invention, the step of providing a one-way valve further includes the steps of providing a water inlet hole located at one end of the one-way valve, providing a plurality of slotted openings located along a section of the first extension, and providing an opening located at one end of the extension.

In an even another embodiment of the third aspect of the present invention, the step of providing an inflation assembly further includes the steps of providing a plurality of vessel assembly tracks operatively connected to the side of the case, providing a plurality of inflation ports located on the side of the case and located between the plurality of vessel assembly tracks, providing a plurality of doors located adjacent to the plurality of vessel assembly tracks such that the plurality of doors is hingedly connected to the case, and providing an inflation vessel operatively connected to the plurality of vessel assembly tracks and located behind the plurality of doors.

The preferred automatically activated flotation device for use on a mobile communications device, according to various embodiments of the present invention, offers the following advantages: ease of use; lightness in weight; durability; compactness in size of the floatation device; the ability to cause the mobile communications device to quickly float to the top of the body of water if the mobile communications device is dropped into a body of water; the ability to be able to re-load the flotation device if the floatation device is activated; and the ability to attach the floatation device to a variety of different sizes of mobile communications devices. In fact, in many of the preferred embodiments, these advantages are optimized to an extent that, is considerably higher than heretofore achieved in prior, known floatation devices.

BRIEF DESCRIPTION OF THE DRAWINGS

The above-mentioned features and steps of the invention and, the manner of attaining t em will become apparent, and the invention itself will be best understood by reference to the following description of the embodiments of the invention in conjunction with the accompanying drawings, wherein like characters represent like parts throughout the several views and in which.

DETAILED DESCRIPTION OF THE PREFERRED EMBODIMENTS OF THE INVENTION

In order to address the shot comings of the prior, known floatation devices, reference is made now to FIGS. 1-9, where there is illustrated automatically activated flotation device 2 for use on a mobile communications device 6. As will be explained hereinafter in greater detail, the automatically activated flotation device 2 is located within a case 4 that can be firmly and securely attached to the mobile communications device 6. It is to be understood that mobile communications device 6 can be, but is not limited to, a mobile telephone, a tablet, a personal digital assistant (PDA), or the like. The automatically activated flotation device 2 for use on a mobile communications device 6 will become activated once the mobile communications device 6 contacts a body of water such as a swimming pool, a lake, pond, a river, a stream, an ocean or the like. Once the mobile communications device 6 has contacted the body of water, the automatically activated flotation device 2 will quickly activate so that the mobile communications device 6 will float to the top of the body of water. The mobile communications device 6 can then be retrieved from the body of water before the water has an opportunity to adversely affect the operating characteristics of the mobile communications device 6.

As shown in FIG. 1-9, there is illustrated automatically activated flotation device 2 for use on a mobile communications device 6 that is constructed according to the present invention. Automatically activated flotation device 2 for use on a mobile communications device 6 includes, in part, pressure relief valve assembly 50, one-way ball valve assembly 100, inflation vessel assembly 150, and chemical rod storage assembly 200.

Figures 1, 2, 4, 5:
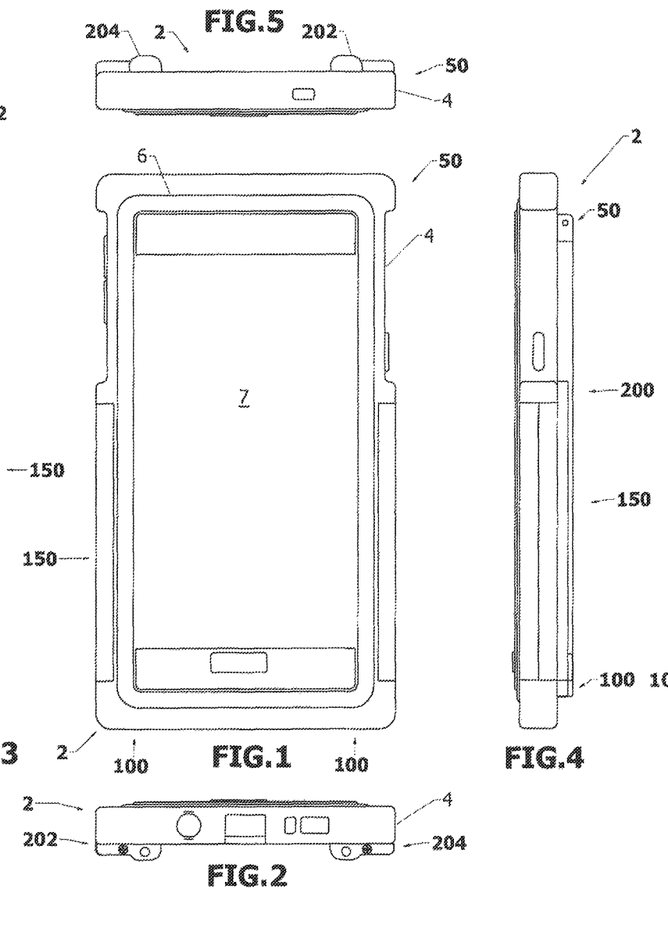
FIG. 1 is a front side view of an automatically activated flotation device for use on a mobile communications device, constructed according, the present invention.
FIG. 2 is a bottom view of the automatically activated flotation device for use on a mobile communications device, constructed according the present invention.
FIG. 4 is a right-side view of the automatically activated flotation device for use on a mobile communications device, constructed according the present invention.
FIG. 5 is a top view of the automatically activated flotation device for use on a mobile communications device, constructed according the present invention.
Figure 3:
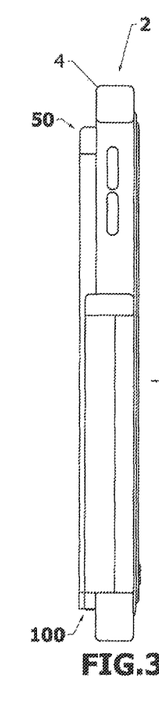
FIG. 3 is a left-side view of the automatically activated flotation device for use on a mobile communications device, constructed according the present invention.
Figure 6:
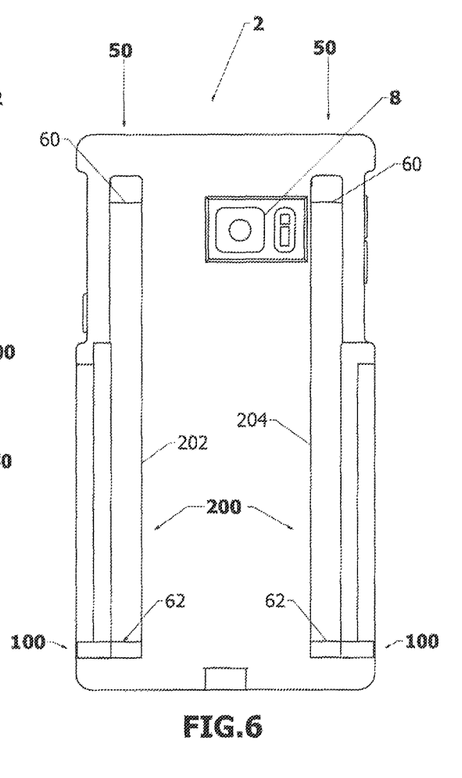
FIG. 6 is a back-side view of the automatically activated flotation device for use on a mobile communications device, constructed according the present invention.

With respect to mobile communications device 6, as shown in FIGS. 1 and 6, mobile communications device 6 is a conventional mobile communications device that also includes a conventional display screen 7 located on the front side of the mobile communications device 6 and a conventional camera assembly 8 located on the back of the mobile communications device 6. A case 4 that includes pressure relief valve assembly 50, one-way ball valve assembly 100, inflation vessel assembly 150, and chemical rod storage assembly 200 is firmly and securely attached to the mobile communications device 6 in a manner that is similar to how conventional mobile communications device cases (not shown) are attached to mobile communications device 6. Unless stated otherwise, it is to be understood that case 4, preferably is constructed of any suitable, durable, lightweight, high strength, drop/shock resistant, UV resistant material such as a polymeric or metallic material. It is to be understood that case 4 can be modified to fit a variety of sizes of mobile communications devices 6 and still perform as will be described.

Regarding pressure relief valve assembly 50, as shown in FIGS. 9, 10a, 10b and 10c, pressure relief valve assembly 50 includes, in part, pressure relief valve 52 having opening 53, spring 54 and ball 56. Preferably, pressure relief valve 52, spring 54 and ball 56 are constructed of any suitable, durable, high strength rust resistant, UV resistant metallic or polymeric material. It is to be further understood that pressure relief valve 52 includes extension 55, opening 57 and pressure exit port 58. It is to be further understood that opening 53, extension 55, opening 57 and pressure exit port 58 are conventionally formed in pressure relief valve 52 by conventional techniques such as molding, forming, thermoforming, drilling, or the like.

Figures 7, 8:
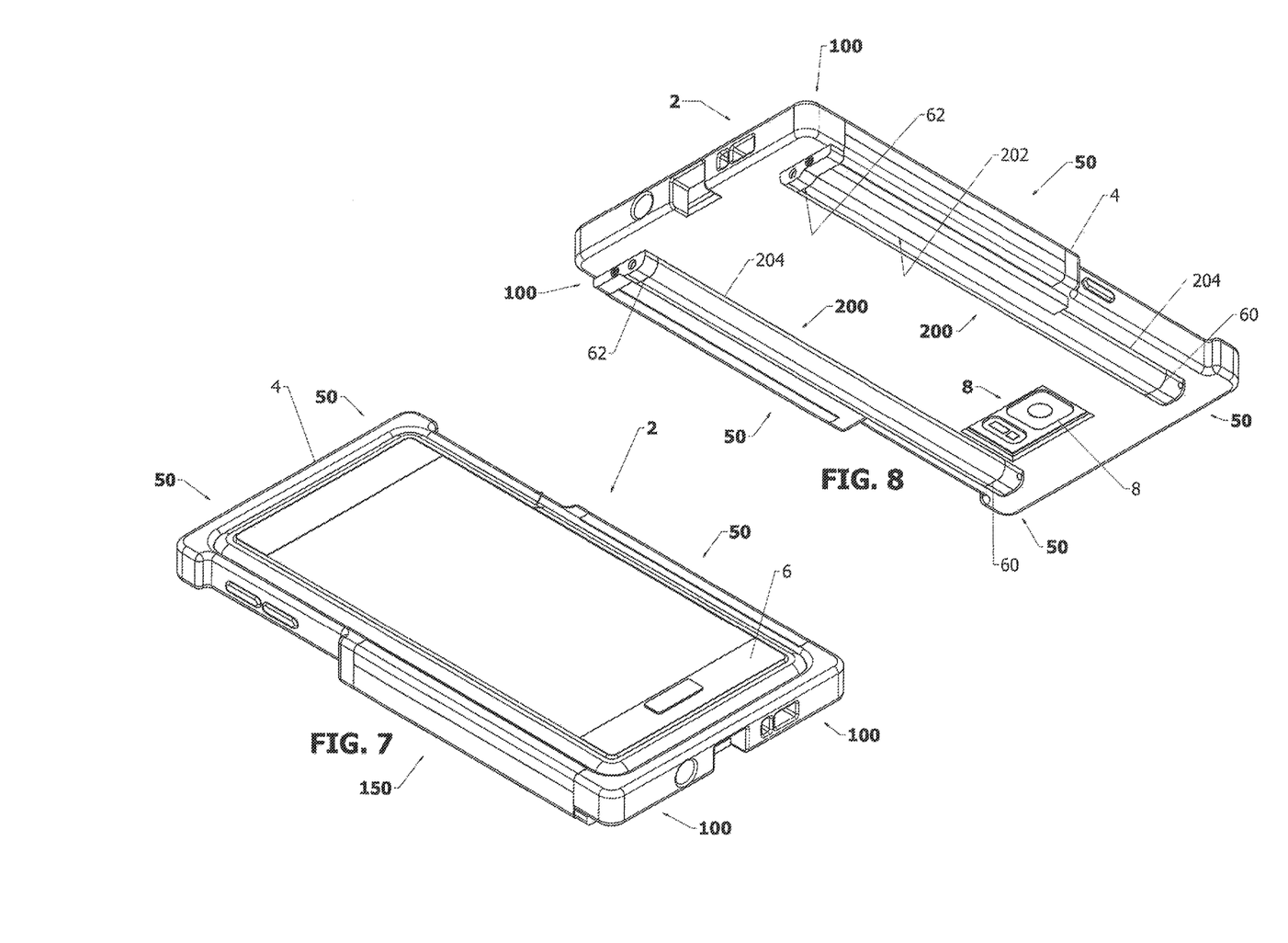
FIG. 7 is a front-side isometric view of the automatically activated flotation device for use on a mobile communications device, constructed according the present invention.
FIG. 8 is a back-side isometric view of the automatically activated flotation device for use on a mobile communications device, constructed according the present invention.
Figure 14A:
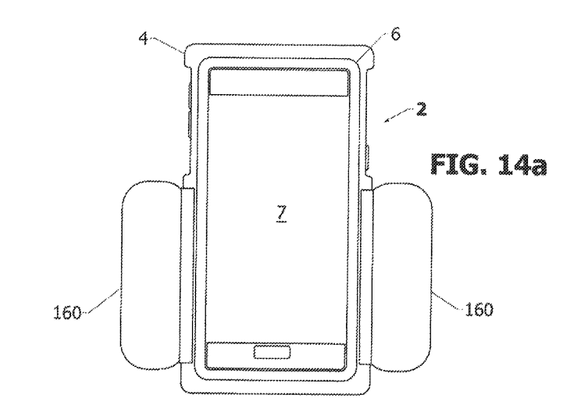
FIG. 14a is a front side view of an automatically activated flotation device for use on a mobile communications device, wherein the flotation device has been activated, constructed according the present invention.

A unique aspect of the present invention is the use of pressure relief valve assembly 50. In particular, the stiffness of spring 54 should be such that it is capable of being compressed by the ball 56 if ball 56 experiences a predetermined excessive pressure in chemical rod storage assembly 200 (FIG. 8). As will be discussed in greater detail later, if mobile communications device 6 contacts a body of water, automatically activated flotation device 2 is activated which causes rods 108 to release a gas as a result of the water contacting rods 108. The release of the gas will cause the flotation vessel 160 (FIG. 10a) to expand and extend out and away from case 4 (FIG. 14a). However, if the pressure produced by the gas created by the interaction of the rods 108 with the water has reached an excessive level, the pressure will cause the ball 56 to move away from opening 57 and push against spring 54. In this manner, excessive pressure will be released through opening 53 and out of pressure exit port 58.

As shown in FIGS. 9, 10a, 10b and 10c, pressure relief valve assembly 50 is constructed by locating spring 54 within extension 55. After spring 54 has been located within extension 55, ball 56 is located in extension 55 so that ball 56 contacts spring 54 and opening 57. Pressure valve 52 having spring 54 and ball 56 is then inserted into opening 60 in rod carrier 204 (FIG. 6). As will be discussed in greater detail later, pressure relief valve assembly 50 is used to inflate inflation vessel 160 if mobile communications device 6 contacts a body of water. In particular, if mobile communications device 6 contacts a body of water, automatically activated flotation device 2 is activated which causes rods 108 to release a gas as a result of the water contacting rods 108. As the gas is released, pressure relief valve assembly 50 acts to stop any gas from being released out of the top of case 4 of automatically activated flotation device 2. Therefore, instead of the gas being released out of the top of case 4 of automatically activated flotation device 2, the release of the gas will cause the flotation vessel 160 (FIG. 10a) to expand and extend out and away from case 4 (FIG. 14a), thereby causing mobile communications device 6 to float to the top of the body of water.

With respect to pressure relief valve 52, it is to be understood that pressure relief valve 52 is retained in the opening 60 in the top of rod, carrier 204 of automatically activated flotation device 2 by conventional fastening techniques such as a snap fit, a magnet, adhesives, fasteners or the like.

Regarding one-way ball valve assembly 100, as shown in FIGS. 9, 10a, 10d and 10e, one-way ball valve assembly 100 includes, in part, one-way ball valve 102 having extension 112 with water inlet hole 116, openings 118, 120, slotted openings 114, fastener 104, ball 106, and fastener opening 110. Preferably, one-way ball valve 102 and ball 106 are constructed of any suitable, durable, high strength, rust resistant, UV resistant metallic or polymeric material. It is to be understood that extension 112, slotted openings 114 and openings 118 and 120 are conventionally formed in one-way ball valve 102 by conventional techniques such as molding, forming, thermoforming, drilling, or the like.

Another unique aspect of the present invention is the use of the one-way ball valve assembly 100. As shown in FIGS. 9, 10a, 10b, 10c and 10e, one-way ball valve assembly 100 is constructed by locating ball 106 within extension 112. In this manner, ball 106 can contact openings 118 and 120, as will be described in greater detail later. After ball 118 has been located within extension 112, one-way ball valve 102 inserted into opening 62 in rod carrier 204 (FIG. 6) and retained on rod carrier 204. As will be discussed in greater detail later, one-way ball valve assembly 100 is used to inflate inflation vessel 160 if mobile communications device 6 contacts a body of water. In particular, if mobile communications device 6 contacts a body of water, automatically activated flotation device 2 is activated which causes rods 108 to release a gas as a result of the water contacting rods 108. In particular, water will, enter water inlet hole 116, flow past opening 120, flow past ball 106 and out slotted openings 114 and opening 118. The water will then interact with chemical rod 108 located in rod carrier 204 which will cause a gas to be created by the interaction between the chemical in chemical rod 108 and the water. Once a sufficient amount of gas has been released, the pressure of the released gas will act against the ball 106 to cause ball 106 to contact opening 120 of one-way ball valve 102 which will substantially prevent any gas from escaping out of one-way ball valve assembly 100. In this manner, the gas created by the interaction of the water that has entered into rod carrier 204 through, one-way ball valve assembly 100 via water inlet hole 116 in one-way ball valve 102 should inflate inflation vessel 160 and not escape out of one-way ball valve assembly 100. It is to be understood that while one-way ball valve assembly 100 is shown and discussed with respect to rod carrier 204, one-way ball valve assembly 100 is also attached and used in a similar manner on rod carrier 202.

Figure 13A:
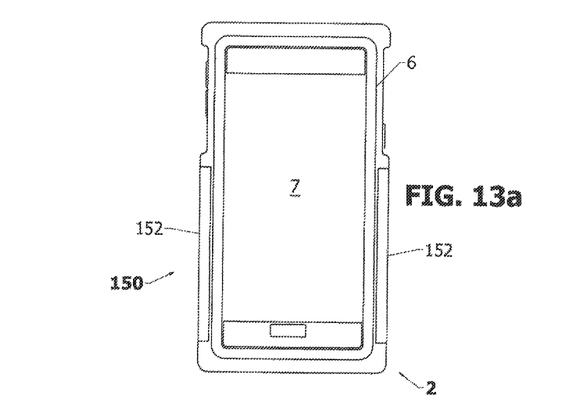
FIG. 13a is a front side view of an automatically activated flotation device for use on a mobile communications device, wherein the flotation device has not been activated, constructed according the present invention.
Figure 13B:
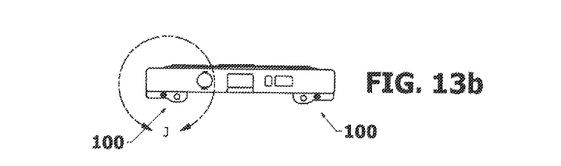
FIG. 13b is a bottom view of an automatically activated flotation device for use on a mobile communications device, wherein the flotation device has not been activated constructed according the present invention.
Figure 13C:
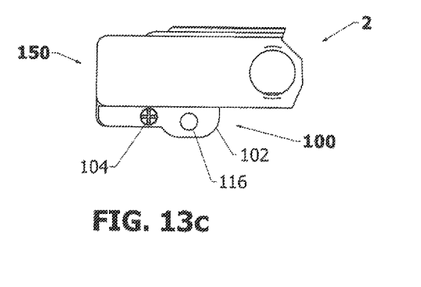
FIG. 13c is a close-up bottom view of the assembly screws for the chemical rod placement/replacement, taken from area J in FIG. 13b, constructed according the present invention.
Figures 14B, 14C:
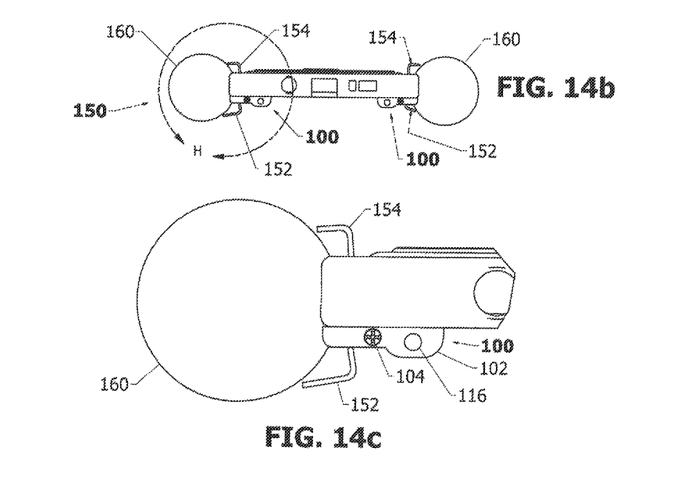
FIG. 14b is a bottom view of an automatically activated flotation device for use on a mobile communications device, wherein the flotation device has been activated, constructed according the present invention.
FIG. 14c is a close-up bottom view of the inflation vessel and the hinged door assembly after the floatation device has been activated, taken from area H in FIG. 14b, constructed according the present invention.

With respect to one-way ball valve 102, it is to be understood that one-way ball valve 102 is retained in the opening 62 in the bottom of rod carrier 204 of automatically activated flotation device 2 by fastener 104 which is located within opening 110 of one-way ball valve 102 (FIGS. 13c and 14c).

Figure 9:
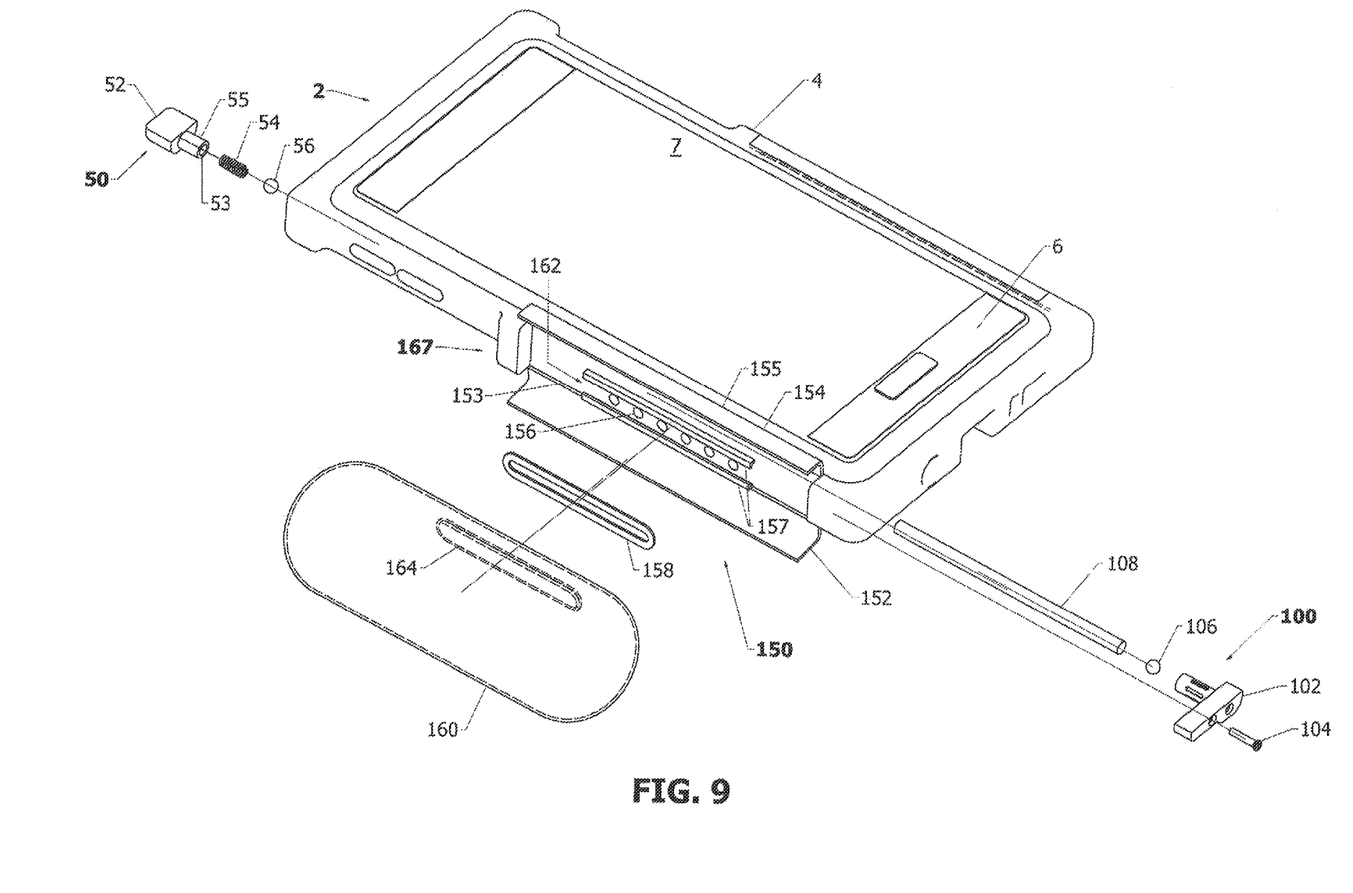
FIG. 9 is a front-side, exploded, isometric view of the automatically activated flotation device for use on a mobile communications device, constructed according the present invention.
Figures 10A, 10B, 10C:
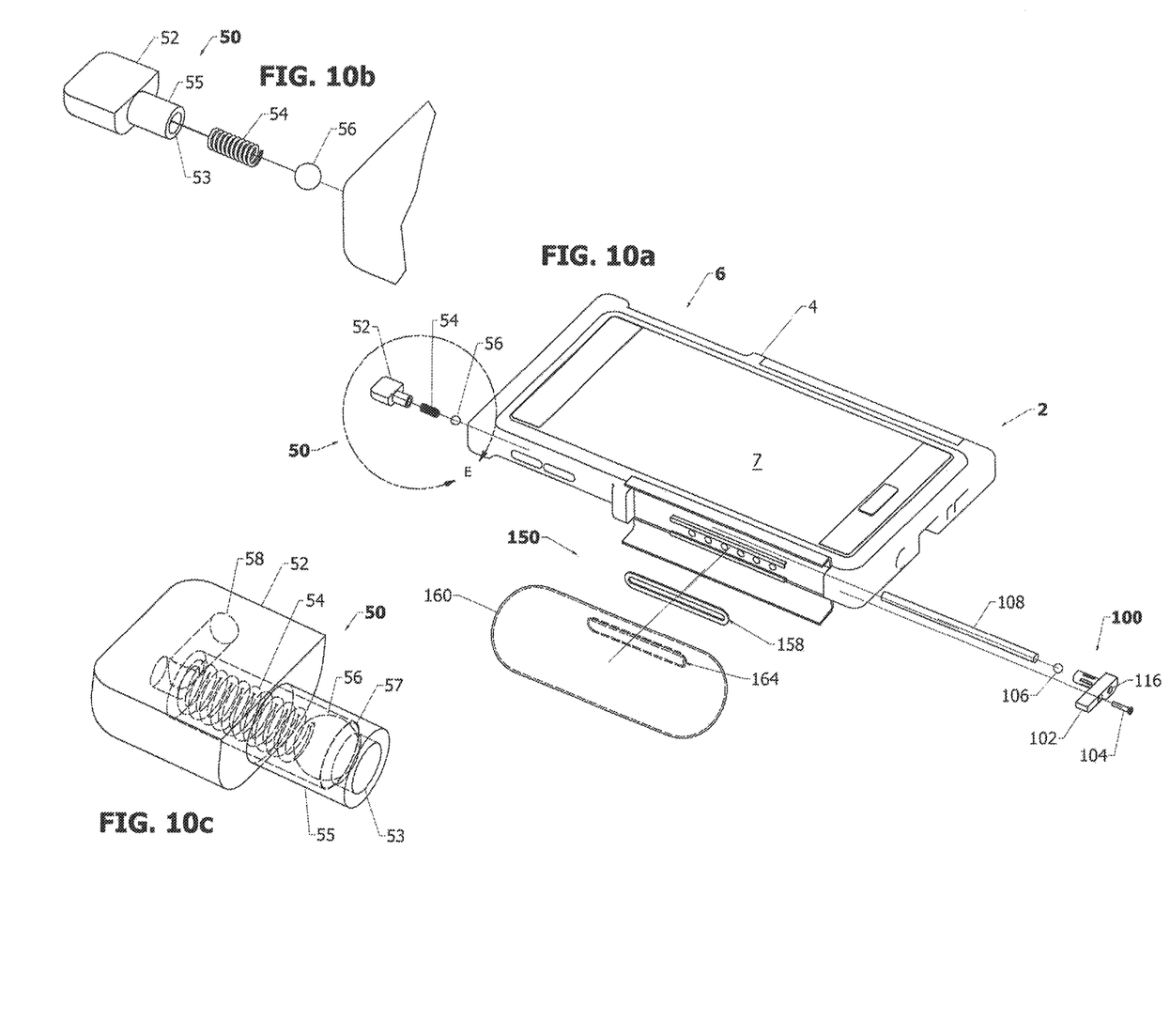
FIG. 10a is a front-side exploded, isometric view of the automatically activated flotation device for use on a mobile communications device showing the construction of the pressure relief valve assembly and the one-way ball valve assembly, constructed according the present invention.
FIG. 10b is a close-up, exploded isometric view of the pressure relief valve assembly, taken from area E in FIG. 10a, constructed according the present invention.
FIG. 10c is an expanded close-up, isometric view of the constructed pressure relief valve assembly, taken from FIG. 10b, constructed according the present invention.
Figures 10A, 10D, 10E:
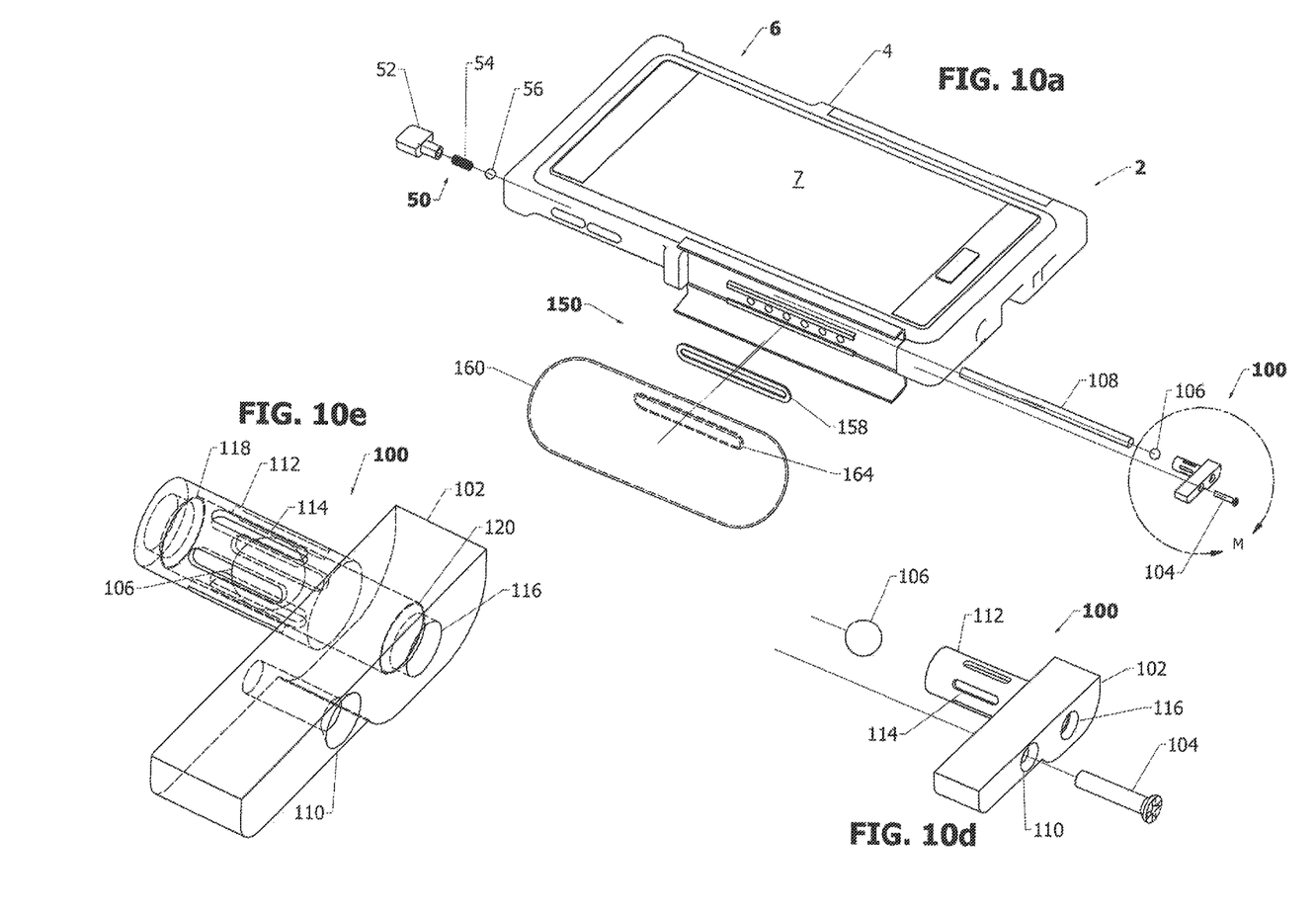
FIG. 10d is a close-up, exploded isometric view of the one-way be valve assembly, taken from area F in FIG. 10a, constructed according the present invention.
FIG. 10e is an expanded close-up, isometric view of the constructed one-way ball valve assembly, taken from FIG. 10d, constructed according the present invention.
Figures 11A, 11B:
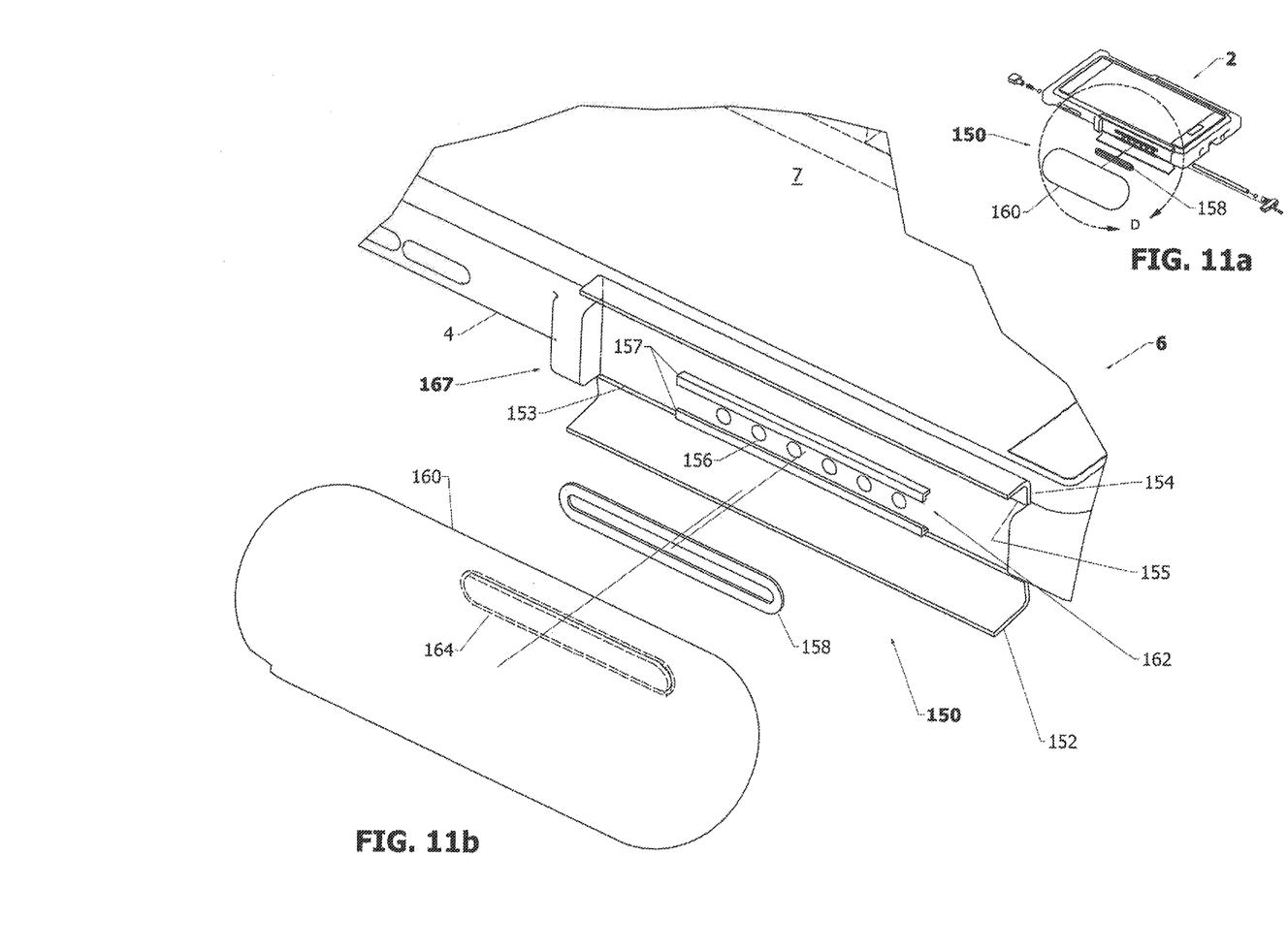
FIG. 11a is a front-side, exploded, isometric view of the automatically activated flotation device for use on a mobile communications device showing the construction of the inflation assembly, constructed according the present invention.
FIG. 11b is a close up, exploded isometric view of the inflation assembly, taken from area in FIG. 11a, constructed according the present invention.
Figure 12A:
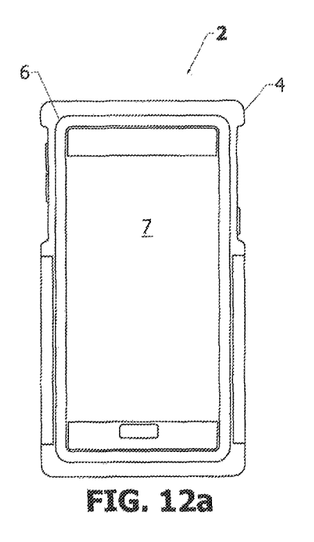
FIG. 12a is a front side view of an automatically activated flotation de for use on a mobile communications device showing the hinged door assembly, constructed according the present invention.
Figure 12B:
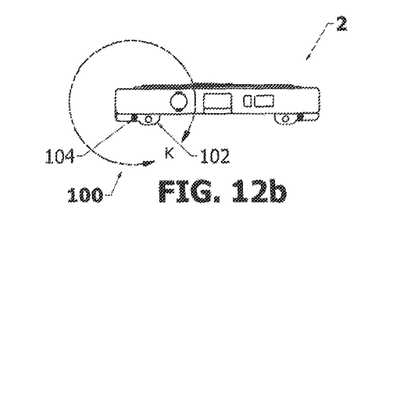
FIG. 12b is a bottom view of an automatically activated flotation device or use on a mobile communications device showing the hinged door assembly, constructed according the present invention.
Figure 12C:
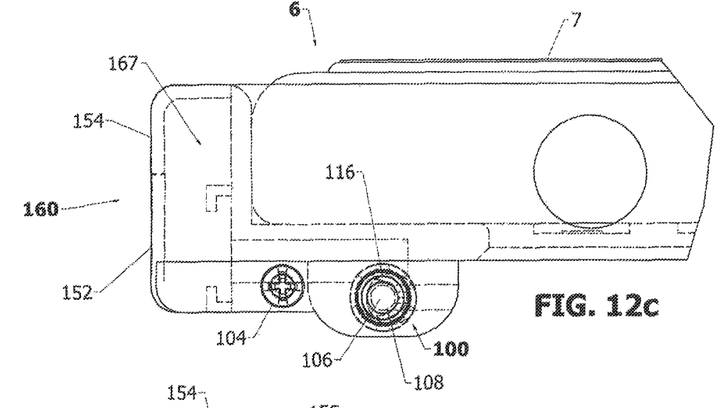
FIG. 12c is a close-up bottom view of the hinged door assembly with the doors in a closed position, taken from area K in FIG. 12b, constructed according the present invention.
Figure 12D:
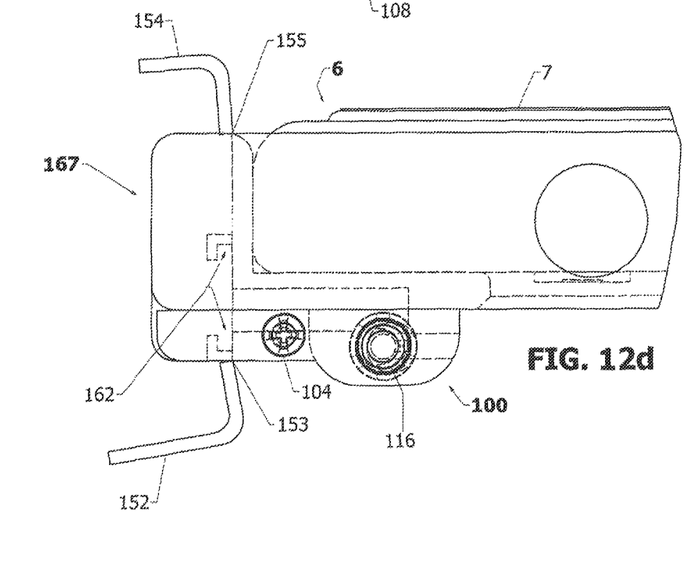
FIG. 12d is a close-up bottom view of the hinged door assembly with the doors in an opened position, constructed according the present invention.

Regarding inflation assembly 150; as shown in FIGS. 9, 11a and 11b, inflation assembly 150 includes, in part, lower door 152 having hinge 153, upper door 154 having hinge 155, inflation ports 156, inflation vessel assembly tracks 157, assembly track 158 and inflation vessel 160. Preferably, lower door 152 having hinge 153, upper door 154 having hinge 155, inflation vessel assembly tracks 157, and assembly track 158 are constructed of any suitable, durable, high strength, rust resistant, UV resistant metallic or polymeric material. It is to be understood that inflation ports 156 are conventionally formed in the side of case 4 by conventional techniques such as drilling, forming, cutting or the like so that inflation ports 156 provide a conduit to allow the gas created by the interaction between the chemical rod 108 and the water to move from rod carrier 204 through inflation ports 156 to inflation vessel 160 which is another unique aspect of the present invention. It is to be further understood that inflation vessel assembly tracks 157 are attached to case 4 by conventional techniques such as adhesives, fasteners, forming or the like. The important factor being that vessel assembly tracks 157 form a slot 162 between the vessel assembly tracks 157 so that assembly track 158 can be firmly and securely retained by vessel assembly tracks 157, as will be discussed in greater detail later.

Figures 15A, 15B:
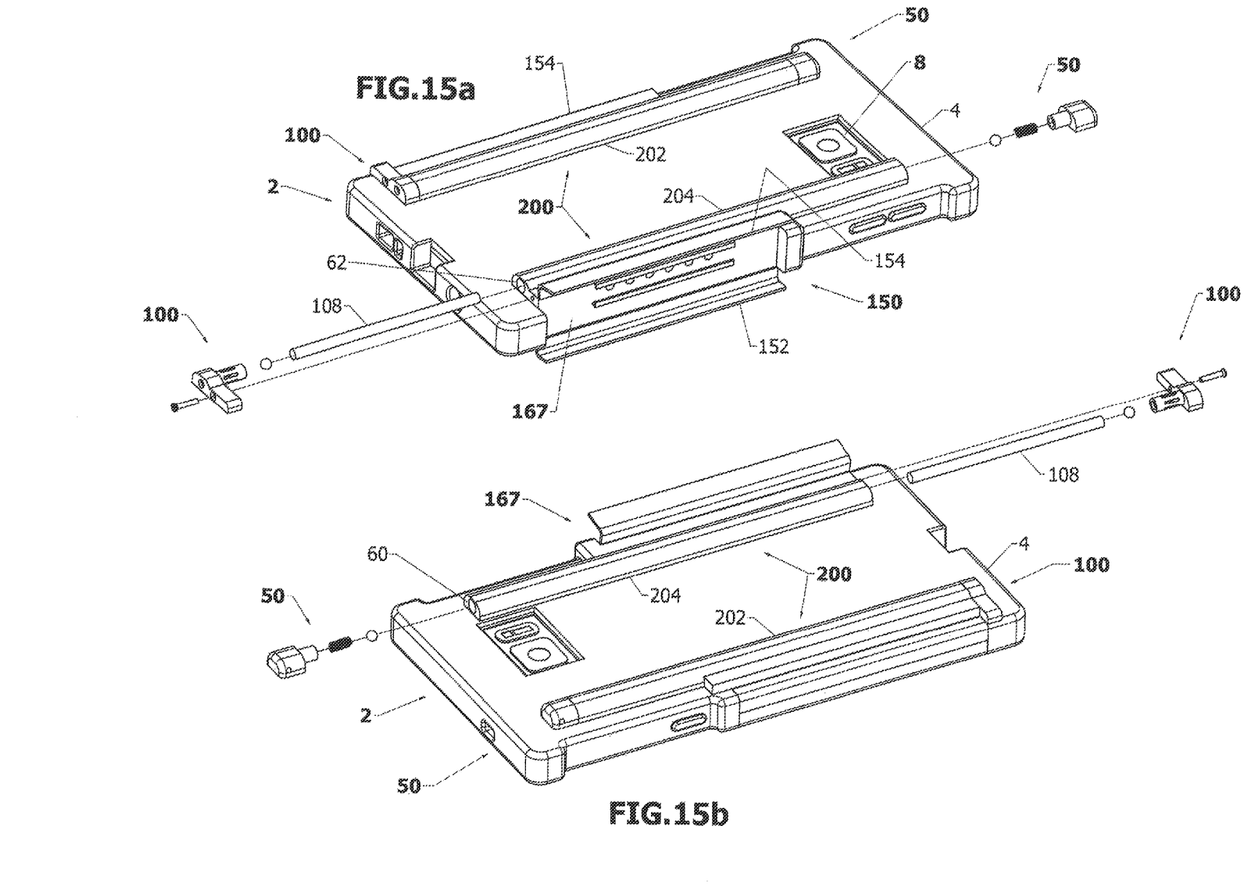
FIG. 15a is a back-side isometric view of the automatically activated flotation device for use on a mobile communications device showing the construction of the chemical rod storage assemblies, constructed according the present invention.
FIG. 15b is another back-side isometric view of the automatically activated flotation device for use on a mobile communications device showing the construction of the chemical rod storage assemblies, constructed according the present invention.

Another unique aspect of the present invention is that both sides of case 4 will include lower door 152 having hinge 153, upper door 154 having hinge 155, inflation ports 156, inflation vessel assembly tracks 157, assembly track 158 and inflation vessel 160, as shown in FIGS. 13a-15b. In this manner, if the if mobile communications device 6 contacts a body of water, both inflation vessels 160 will inflate. Also, if for some reason one of the inflation vessels 160 does not inflate, the fact that there are two inflation vessels 160 adds a redundancy to the automatically activated flotation device 2 which is another unique aspect of the present invention. As shown in FIGS. 15a and 15b, chemical rod storage assemblies 200 are used to inflate both inflation vessels 160.

As shown in FIGS. 9, 11a and 11b, inflation assembly 150 is constructed by attaching assembly track 158 to an opening 164 in inflation vessel 160. It is to be understood that assembly track 158 is attached to the opening 164 in inflation vessel 160 by conventional techniques such as adhesives, fasteners, forming or the like. Once the assembly track 158 has been attached to inflation vessel 160, the assembly track 158 is slid into place on slot 62 between vessel assembly tracks 157 such that inflation vessel 160 is now firmly and securely retained by assembly track 158 and vessel assembly tracks 157.

After the inflation vessel 160 has been retained by vessel assembly tracks 157, inflation vessel 160 is conventionally folded, rolled or otherwise gathered up. The folded inflation vessel 160 is then retained within inflation assembly 150 by rotating door 152 on hinge 153 and door 154 on hinge 155 so that the folded inflation vessel 160 is retained within the space 167 in inflation assembly 150, as shown in FIGS. 11a and 13a-13c, as will be described in greater detail later.

It is to be understood that the size and shape of inflation vessel 160 should be such that it is capable of being folded, rolled or otherwise gathered up so that it properly fits within the space 167 between closed doors 152 and 154 and the vessel assembly tracks 157. Furthermore, it is to be understood that inflation vessel 160, preferably, is constructed of any suitable, lightweight, durable, waterproof, easily inflatable polymeric material. Finally, it is to be understood that inflation vessel 160 can include a variety of colors and/or graphics so that when the inflation vessel 160 is inflated and the mobile communications device 6 floats to the top of the body of water, the inflation vessel 160 can be easily identified.

It is to be understood that while only one inflation assembly 150 is shown, the automatically activated flotation device 2 includes an inflation assembly 150 on both sides of case 4, as will be described in greater detail later.

Regarding chemical rod storage assembly 200, as shown in FIGS. 8, 9, 10a, 11a, 12b, 12c, 12d, 15a and 15b, chemical rod storage assemblies 200 includes part, rod carrier 202, rod carrier 204, and chemical rod 108. It is to be understood that case 4 is to be constructed to include element 202 and rod carrier 204 as part of its single-piece construction. In this manner, rod carrier 202 and rod carrier 204 are formed on case 4 by conventional forming, pressing, molding or the like. Chemical rod 108, preferably, is constructed of a conventional effervescent material designed to produce solutions that release carbon dioxide simultaneously when the effervescent material contacts a liquid such as water. It is known that the effervescent material can be prepared by compressing the active ingredients with mixture of sodium bicarbonate and organic acids such as citric and tartaric acid. The effervescent material is then conventionally formed into rods. In this manner, when water contacts chemical rod 108, the interaction between the water and the chemical rod 108 will cause a chemical reaction that results in a gas being given off. As discussed earlier, the gas that is given off is used to inflate inflation vessel 160.

As shown in FIGS. 9, 10a, 11a, 12b, 12c, and 12d, chemical rod 108 is located within rod carriers 202 and 204. In this manner, if mobile communications device 6 contacts a body of water, water will enter into water inlet hole 116 of one-way valve 102. The water will then interact with chemical rod 108 thereby causing a chemical reaction between the chemical rod 108 and the water that results in a gas being given off. As discussed earlier, the gas that is given off is used to inflate inflation vessel 160. It is to be understood that while the construction of rod carrier 204 is described, rod carrier 202 is constructed and used in a similar manner as rod carrier 204 as shown in FIGS. 15a and 15b.

Another unique aspect of the present invention is the use of rod carriers 202 and 204. If the mobile communications device 6 is dropped into a body of water, rod carriers 202 and 204 will allow water to get into either or both of the rod carriers 202 and 204 and at least inflate one of the inflation vessels 160. If one of the inflation vessel assemblies 150 and/or chemical rod storage assemblies 200 fails to work properly, the use of the two chemical rod storage assemblies 200 will act as a kind of redundancy. Ideally, both should inflate but if only one inflates, the automatically activated flotation device 2 is designed so that one inflated inflation vessel 160 will be enough to cause the phone to float to the top of the water. It is to be further understood that automatically activated flotation device 2 can also include dry storage areas (not shown) which can be located adjacent to each of the chemical rod storage assemblies 200 for storing extra inflation vessels 160 and chemical rods 108.

With respect to the construction of automatically activated flotation device 2, attention is directed to FIGS. 1-15*b*. In particular, spring 54 and ball 56 are installed into pressure relief valve 52. Pressure relief valve 52 is then installed into the top of rod carrier 204 at opening 60 to complete the assembly of pressure relief valve assembly 50.

After pressure relief valve assembly 50 has been attached to the top of rod carriers 202 and 204 at opening 62, one-way ball valve assembly 100 is then attached to the bottom of rod carriers 202 and 204. In particular, chemical rod 108 is placed within rod carriers 202 and 204. Ball 106 is located within extension 112 of ball valve 102. Fastener 104 is inserted into opening 110. In this manner, ball valve 102 is then fastened to the bottom of rod carriers 202 and 204 by attaching fastener 104 to the bottom of rod carriers 202 and 204 at opening 62.

Once the pressure relief valve assembly 50 and the one-way ball valve assembly 100 have been attached to case 4, inflation assemblies 150 are installed. In particular, inflation vessel 160 is attached to inflation vessel assembly tracks 157 by assembly track 158. It is to be understood that assembly track 158 must be located over inflation ports 156 so that inflation vessel 160 will properly inflate. The inflation vessel 160 is then folded, rolled or otherwise gathered up and placed within the space 167 so that doors 152 and 154 can be closed, as shown in FIGS. 12*c* and 13*a*-13*c*.

During the operation of automatically activated flotation device 2, attention is directed to FIGS. 13*a*-15*b*. In particular, after the automatically activated flotation device 2 has been constructed, as discussed above and shown in FIGS. 13*a*-15*b*, if the automatically activated flotation device 2 should contact a body of water, water will quickly enter through water inlet hole 116.

Once the water has entered into rod carriers 204 and 202, the water will interact with the chemical rods 108 located in rod carriers 202 and 204. When water contacts chemical rod 108, the interaction between the water and the chemical rod 108 will cause a chemical reaction that results in a gas being given off. Once the gas has reached a desired pressure, the pressure will interact with pressure relief valve assembly 50. As the gas is released, pressure relief valve assembly 50 acts to stop any gas from being released out of the top of case 4 of automatically activated flotation device 2, as discussed earlier. Therefore, instead of the gas being released out of the top of case 4 of automatically activated flotation device 2, the release of the gas will cause the flotation vessel 160 (FIG. 10*a*) to expand and extend out and away from case 4 (FIG. 14*a*), thereby causing mobile communications device 6 to float to the top of the body of water.

However, as discussed above, if the pressure created by the gas created by the interaction of the rods 108 with the water has reached an excessive level, the pressure will cause the ball 56 to move away from opening 57 and push against spring 54. In this manner, excessive pressure will be released through opening 53 and out of pressure exit port 58.

Furthermore, once the gas has reached a desired pressure, the pressure will interact with one-way ball valve assembly 100. As the gas is released, one-way ball valve assembly 100 acts to stop any gas from being released out of the bottom of case 4 of automatically activated flotation device 2, as discussed earlier.

Once a sufficient gas pressure has been developed with rod carriers 202 and 204 so that pressure relief valve assembly 50 and one-way ball valve assembly 100 have been activated, the gas created from the water/chemical rod 108 chemical reaction should then travel through inflation ports 156, as discussed earlier. In this manner, the gas will then begin to rapidly inflate inflation vessels 160 which will cause inflation vessels 160 to expand, thereby causing doors 152 and 154 to open along hinges 153 and 155, respectively (as shown in FIGS. 12*d*, 14*a*-14*c*, 15*a* and 15*b*).

After the doors 152 and 154 have been opened by the inflation of inflation vessel 160 the inflation vessels 160 will rapidly expand, as shown in FIGS. 14*a*-14*c*. The inflation of inflation vessels 160 will then cause the mobile communications device 6 to float to the top of the body of water (or, at least, close to the top of the body water) so that the mobile communications device 6 can be retrieved from the body of water.

Another unique aspect of the present invention is that if automatically activated flotation device 2 has been activated because the mobile communications device 6 has been dropped in a body of water or the automatically activated flotation device 2 has accidentally activated due to an equipment malfunction, the end user can easily re-load automatically activated flotation device 2. In particular, the end user can check to see if the chemical rod 108 has been activated (if the chemical rod 108 has contacted water) by removing fastener 104 from one-way ball valve 102. If the chemical rod 108 has contacted water and is, therefore, used up or spent, the end user can remove the remains of the chemical rod 108 from rod carriers 202 and/or 204 and replace the used chemical rod 108 with a new chemical rod 108. The end user can then re-attach one-way ball valve 102 to the bottom of rod carriers 202 and/or 204. The end user will then fold, roll or otherwise gather up inflated inflation vessel 160 and store the folded inflation vessel 160 back into space 167, as discussed earlier. Finally, the end user can rotate doors 152 and 154 so that folded inflation vessel 160 is again retained behind doors 152 and 154, as discussed earlier.

The preceding merely illustrates the principles of the invention. It will thus be appreciated that those skilled in the art will be able to devise various arrangements which, although not explicitly described or shown herein, embody the principles of the invention and are included within its spirit and scope. Furthermore, all examples and conditional language recited herein are principally intended expressly to be only for pedagogical purposes and to aid the reader in understanding the principles of the invention and the concepts contributed by the inventors to furthering the art and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents and equivalents developed in the future, i.e., any elements developed that perform the same function, regardless of structure.

This description of the exemplary embodiments is intended to, be read in connection with the figures of the accompanying drawing, which are to be considered part of the entire written description. In the description, relative terms such as "lower," "upper," "horizontal," "vertical," "above," "below," "up," "down," "top" and "bottom" as well as derivatives thereof (e.g., "horizontally," "downwardly," "upwardly," etc.) should be construed to refer to the orientation as then described or as shown in the drawing under discussion. These relative terms are for convenience of description and do not require that the apparatus be constructed or operated in a particular orientation. Terms concerning attachments, coupling and the like, such as "connected" and "interconnected," refer to a relationship wherein structures are secured or attached to one another either directly or indirectly through intervening structures, as well as both movable or rigid attachments or relationships, unless expressly described otherwise.

All patents, publications, scientific articles, web sites, and other documents and materials referenced or mentioned herein are indicative of the levels of skill of those skilled in the art to which the invention pertains, and each such referenced document and material is hereby incorporated by reference to the same extent as if it had been incorporated by reference in its entirety individually or set forth herein in its entirety.

The applicant reserves the right to physically incorporate into this specification any and all materials and information from any such patents, publications, scientific articles, web sites, electronically available information, and other referenced materials or documents to the extent such incorporated materials and information are not inconsistent with the description herein.

The written description portion of this patent includes all claims. Furthermore, all claims, including all original claims as well as all claims from any and all priority documents, are hereby incorporated by reference in their entirety into the written description portion of the specification, and Applicant(s) reserve the right to physically incorporate into the written description or any other portion of the application, any and all such claims. Thus, for example, under no circumstances may the patent be interpreted as allegedly not providing a written description for a claim on the assertion that the precise wording of the claim is not set forth in haec verba in written description portion of the patent.

The claims will be interpreted according to law. However, and notwithstanding the alleged or perceived ease or difficulty of interpreting any claim or portion thereof, under no circumstances may any adjustment or amendment of a claim or any portion thereof during prosecution of the application or applications leading to this patent be interpreted as having forfeited any right to any and all equivalents thereof that do not form a part of the prior art.

All of the features disclosed in this specification may be combined in any combination. Thus, unless expressly stated otherwise, each feature disclosed is only an example of a generic series of equivalent or similar features.

It is to be understood that while the invention has been described in conjunction with the detailed description thereof, the foregoing description is intended to illustrate and not limit the scope of the invention, which is defined by the scope of the appended claims. Thus, from the foregoing, it will be appreciated that, although specific embodiments of the invention have been described herein for the purpose of illustration, various modifications may be made without deviating from the spirit and scope of the invention. Other aspects, advantages, and modifications are within the scope of the following claims and the present invention is not limited except as by the appended claims.

The specific methods and compositions described herein are representative of preferred embodiments and are exemplary and not intended as limitations on the scope of the invention. Other objects, aspects, and embodiments will occur to those skilled in the art upon consideration of this specification, and are encompassed within the spirit of the invention as defined by the scope of the claims. It will be readily apparent to one skilled in the art that varying substitutions and modifications may be made to the invention disclosed herein without departing from the scope and spirit of the invention. The invention illustratively described herein suitably may be practiced in the absence of any element or elements, or limitation or limitations, which is not specifically disclosed herein as essential. Thus, for example, in each instance herein, in embodiments or examples of the present invention, the terms "comprising" "including", "containing", etc. are to be read expansively and without limitation. The methods and processes illustratively described herein suitably may be practiced in differing orders of steps, and that they are not necessarily restricted to the orders of steps indicated herein or in the claims.

The terms and expressions that have been employed are used as terms of description and not of limitation, and there is no intent in the use of such terms and expressions to exclude any equivalent of the features shown and described or portions thereof, but it is recognized that various modifications are possible within the scope of the invention as claimed. Thus, it will be understood that although the present invention has been specifically disclosed by various embodiments and/or preferred embodiments and optional features, any and all modifications and variations of the concepts herein disclosed that may be resorted to by those skilled in the art are considered to be within the scope of this invention as defined by the appended claims.

The invention has been described broadly and generically herein. Each of the narrower species and sub-generic groupings falling within the generic disclosure also form part of the invention. This includes the generic description of the invention with a proviso or negative limitation removing any subject matter from the genus, regardless of whether or not the excised material is specifically recited herein.

It is also to be understood that as used herein and in the appended claims, the singular forms "a," "an," and "the" include plural reference unless the context clearly dictates otherwise, the term "X and/or Y" means "X" or "Y" or both "X" and "Y", and the letter "s" following a noun designates both the plural and singular forms of that noun. In addition, where features or aspects of the invention are described in terms of Markush groups, it is intended and those skilled in the art will recognize, that the invention embraces and is also thereby described in terms of any individual member or subgroup of members of the Markush group.

Other embodiments are within the following claims. Therefore, the patent may not be interpreted to be limited to the specific examples or embodiments or methods specifically and/or expressly disclosed herein. Under no circumstances may the patent be interpreted to be limited by any statement made by any Examiner or any other official or employee of the Patent and Trademark Office unless such statement is specifically and without qualification or reservation expressly adopted in a responsive writing by Applicants.

Although the invention has been described in terms of exemplary embodiments, it is not limited thereto. Rather, the appended claims should be construed broadly, to include other variants and embodiments of the invention, which may be made by those skilled in the art without departing from the scope and range of equivalents of the invention.

Other modifications and implementations will occur to those skilled in the art without departing from the spirit and the scope of the invention as claimed. Accordingly, the description hereinabove is not intended to limit the invention, except as indicated in the appended claims.

Therefore, provided herein is a new and improved automatically activated flotation device for use on a mobile communications device. The preferred automatically activated flotation device for use on a mobile communications device, according to various embodiments of the present invention, offers the following advantages: ease of use; lightness in weight; durability; compactness in size of the floatation device; the ability to cause the mobile communications device to quickly float to the top of the body of water if the mobile communications device is dropped in a body of water; the ability to be able to re-load the flotation device if the floatation device is activated; and the ability to attach the floatation device to a variety of different sizes of mobile communications devices. In fact, in many of the preferred embodiments, these advantages of ease of use; lightness in weight, durability, compactness in size of the floatation device, the ability to cause the mobile communications device to quickly float to the top of the body of water if the mobile communications device is dropped in a body of water, the ability to be able to re-load the flotation device if the floatation device is activated, and the ability to attach the floatation device to a variety of different sizes of mobile communications devices are optimized to an extent that is considerably higher than heretofore achieved in prior, known floatation devices.

I claim:

1. An automatically activated flotation device, for use on a mobile communications device, comprising:
   a mobile communications device having a front side and a back side; and a case operatively attached to the back side of the mobile communications device wherein the case includes a front side and a back side, wherein the front side of the case is located adjacent to the back side of the mobile communications device, wherein the case is further comprised of;
   at least one rod carrier operatively connected to a portion of the back side of the case wherein the at least one rod carrier has a first end and a second end, a one-way valve assembly operatively connected to the first end of the rod carrier, a chemical rod located within the at least one rod carrier and located adjacent to the one-way valve assembly, and
   an inflation assembly operatively connected to a side of the case and operatively connected to the at least one rod carrier, wherein if the mobile communications device contacts a body of water, a portion of the body of water interacts with the chemical rod to produce a gas that triggers the inflation assembly to inflate and cause the mobile communications device to float on the body of water.

2. The automatically activated flotation device for use on a mobile communications device, according to claim 1, wherein the case is further comprised of:
   a pressure relief valve assembly operatively connected to the second end of the rod carrier.

3. The automatically activated flotation device for use on a mobile communications device, according to claim 2, wherein the pressure relief valve assembly is further comprised of:
   a pressure relief valve having a second extension located at one end of the pressure relief valve and a pressure exit port located adjacent to another end of the pressure relief valve;
   a spring located within the second extension; and
   a second ball located within the second extension wherein the second ball contacts the spring.

4. The automatically activated flotation device for use on, a mobile communications device according to claim 1, wherein the one-way valve assembly is further comprised of:
   a one-way valve having a first extension; and
   a first ball located within the first extension.

5. The automatically activated flotation device for use on a mobile communications device, according to claim 4, wherein the one-way valve is further comprised of:
   a water inlet hole located at one end of the one-way valve;
   a plurality of slotted openings located along a section of the first extension; and
   an opening located at one end of the extension.

6. The automatically activated flotation device for use on a mobile communications device, according to claim 1, wherein the inflation assembly is further comprised of:
   a plurality of vessel assembly tracks operatively connected to the side of the case;
   a plurality of inflation ports located on the side of the case and located between the plurality of vessel assembly tracks;
   a plurality of doors located adjacent to the plurality of vessel assembly tracks wherein the plurality of doors is hingedly connected to the case; and
   an inflation vessel operatively connected to the plurality of vessel assembly tracks and located behind the plurality of doors.

7. The automatically activated flotation device for use on a mobile communications device, according to claim 6, wherein the inflation vessel is further comprised of:
   an assembly track operatively connected to the inflation vessel.

8. The automatically activated flotation device for use on a mobile communications device, according to claim 1, wherein the chemical rod is further comprised of:
   an effervescent material designed to produce a solution that releases carbon dioxide simultaneously when the effervescent material contacts a liquid.

9. An automatically activated flotation device for use on a mobile communications device, comprising:
   a mobile communications device having a front side and a back side; and a case operatively attached to the back side of the mobile communications device wherein the case includes a front side and a back side, wherein the front side of the case is located adjacent to the back side of the mobile communications device, wherein the case is further comprised of;
   at least one rod carrier operatively connected to a portion of the back side of the case wherein the at least one rod carrier has a first end and a second end,
   a one-way valve assembly operatively connected to the first end of the rod carrier,
   a pressure relief valve assembly operatively connected to the second end of the rod carrier,
   a chemical rod located within the at least one rod carrier and located adjacent to the one-way valve assembly, and
   an inflation assembly operatively connected to a side of the case and operatively connected to the at least one rod carrier, wherein if the mobile communications device contacts a body of water, a portion of the body of water interacts with the chemical rod to produce a gas that triggers the inflation assembly to inflate and cause the mobile communications device to float on the body of water.

10. The automatically activated flotation device for use on a mobile communications device, according to claim 9, wherein the one-way valve assembly is further comprised of:
- a one-way valve having a first extension; and
- a first ball located within the first extension.

11. The automatically activated flotation device for use on a mobile communications device, according to claim 10 wherein the one-way valve is further comprised of:
- a water inlet hole located at one end of the one-way valve;
- a plurality of slotted openings located along a section of the first extension, and an opening located at one end of the extension.

12. The automatically activated flotation device for use on a mobile communications device, according to claim 9, wherein the inflation assembly is further comprised of:
- a plurality of vessel assembly tracks operatively connected to the side of the case;
- a plurality of inflation ports located on the side of the case and located between the plurality of vessel assembly tracks;
- a plurality of doors located adjacent to the plurality of vessel assembly tracks wherein the plurality of doors is hi godly connected to the case; and
- an inflation vessel operatively connected to the plurality of vessel assembly tracks and located behind the plurality of doors.

13. The automatically activated flotation device for use on, a mobile communications device, according to claim 12, wherein the inflation vessel is further comprised of:
- an assembly track operatively connected to the inflation vessel.

14. The automatically activated flotation device for use on a mobile communications device, according to claim 9, wherein the pressure relief valve assembly is further comprised of:
- a pressure relief valve having a second extension located at one end of the pressure relief valve and a pressure exit port located adjacent to another end of the pressure relief valve;
- a spring located within the second extension; and
- a second ball located within the second extension wherein the second ball contacts the spring.

15. The automatically activated flotation device for use on a mobile communications device, according to claim 9, wherein the chemical rod is further comprised of:
- an effervescent material designed to produce a solution that releases carbon dioxide simultaneously when the effervescent material contacts a liquid.

16. A method of constructing an automatically activated flotation device for use on a mobile communications device, comprising the steps of:
- providing a mobile communications device having a front side and a back side; and
- providing a case operatively attached to the back side of the mobile communications device wherein the case includes a front side and a back side, wherein the front side of the case is located adjacent to the back side of the mobile communications device, wherein the step of providing a case is further comprised of the steps of;
- providing at least one rod carrier operatively connected to a portion of the back side of the case wherein the at least one rod carrier has a first end and a second end,
- providing a one-way valve assembly operatively connected to the first end of the rod carrier,
- providing a chemical rod located within the at least one rod ca and located adjacent to the one-way valve assembly, and
- providing an inflation assembly operatively connected to a side of the case and operatively connected to the at least one rod carrier, wherein if the mobile communications device contacts a body of water, a portion of the body of water interacts with the chemical rod to produce a gas that triggers the inflation assembly to inflate and cause the mobile communications device to float on the body of water.

17. The method of constructing an automatically activated flotation device for use on a mobile communications device, according to claim 16, wherein the step of providing a case is further comprised of the step of:
- providing a pressure relief valve assembly operatively connected to the second end of the rod carrier.

18. The method of constructing an automatically activated flotation device for use on a mobile communications device, according to claim 16, wherein the step of providing a one-way valve assembly is further comprised of the steps of:
- providing a one-way valve having a first extension; and
- providing a first ball located within the first extension.

19. The method of constructing an automatically activated flotation device for use on a mobile communications device, according to claim 18, wherein the step of providing a one-way valve is further comprised of the steps of:
- providing a water inlet hole located at one end of the one-way valve;
- providing a plurality of slotted openings located along a section of the first extension; and
- providing an opening located at one end of the extension.

20. The automatically activated flotation device for use on a mobile communications device, according to claim 16, wherein the step of providing an inflation assembly is further comprised of the steps of:
- providing a plurality of vessel assembly tracks operatively connected to the side of the case;
- providing a plurality of inflation ports located on the side of the case and located between the plurality of vessel assembly tracks;
- providing a plurality of doors located adjacent to the plurality of vessel assembly tracks wherein the plurality of doors is hingedly connected to the case; and
- providing an inflation vessel operatively connected to the plurality of vessel assembly tracks and located behind the plurality of doors.

\* \* \* \* \*